United States Patent

[11] 3,554,085

| [72] | Inventor | Philip Butterworth<br>Bramhall, England |
|---|---|---|
| [21] | Appl. No. | 795,101 |
| [22] | Filed | Jan. 29, 1969 |
| [45] | Patented | Jan. 12, 1971 |
| [73] | Assignee | Butterworth Hydraulic Development<br>Limited<br>a British Company |
| [32] | Priority | Feb. 12, 1968 |
| [33] | | Great Britain |
| [31] | | No. 6798/68 |

[54] FLUID PRESSURE OPERATED MOTORS
11 Claims, 1 Drawing Fig.

[52] U.S. Cl. ................................................. 91/239,
91/243, 91/277, 91/309, 91/426, 91/409
[51] Int. Cl. ....................................................... F01l 15/04,
F01l 21/02, F01l 25/06
[50] Field of Search........................................... 91/277,
357, 278, 239, 243, 409, 309

[56] References Cited
UNITED STATES PATENTS

| 1,484,030 | 1/1923 | Kitchen ........................ | 91/357 |
|---|---|---|---|
| 1,841,629 | 1/1932 | Pigeolet ....................... | 91/357 |
| 2,325,138 | 7/1943 | Kyle et al. .................... | 91/278 |
| 3,334,547 | 8/1967 | Grundmann ................. | 91/309 |

FOREIGN PATENTS

| 374,080 | 5/1932 | Great Britain ................ | 91/278 |

*Primary Examiner*—Paul E. Maslousky
*Attorney*—Stevens, Davis, Miller & Mosher

ABSTRACT: A fluid pressure operated motor having a cylindrical sleeve slidably located in a piston housing and surrounding a piston; the piston being movable axially within the housing; and a fluid pressure pad for locking the sleeve in a given position; the sleeve having pegs located on the inner surface thereof to engage the piston to permit the center of oscillation of the piston to be axially adjusted within predetermined limits relative to the housing.

PATENTED JAN 12 1971
3,554,085
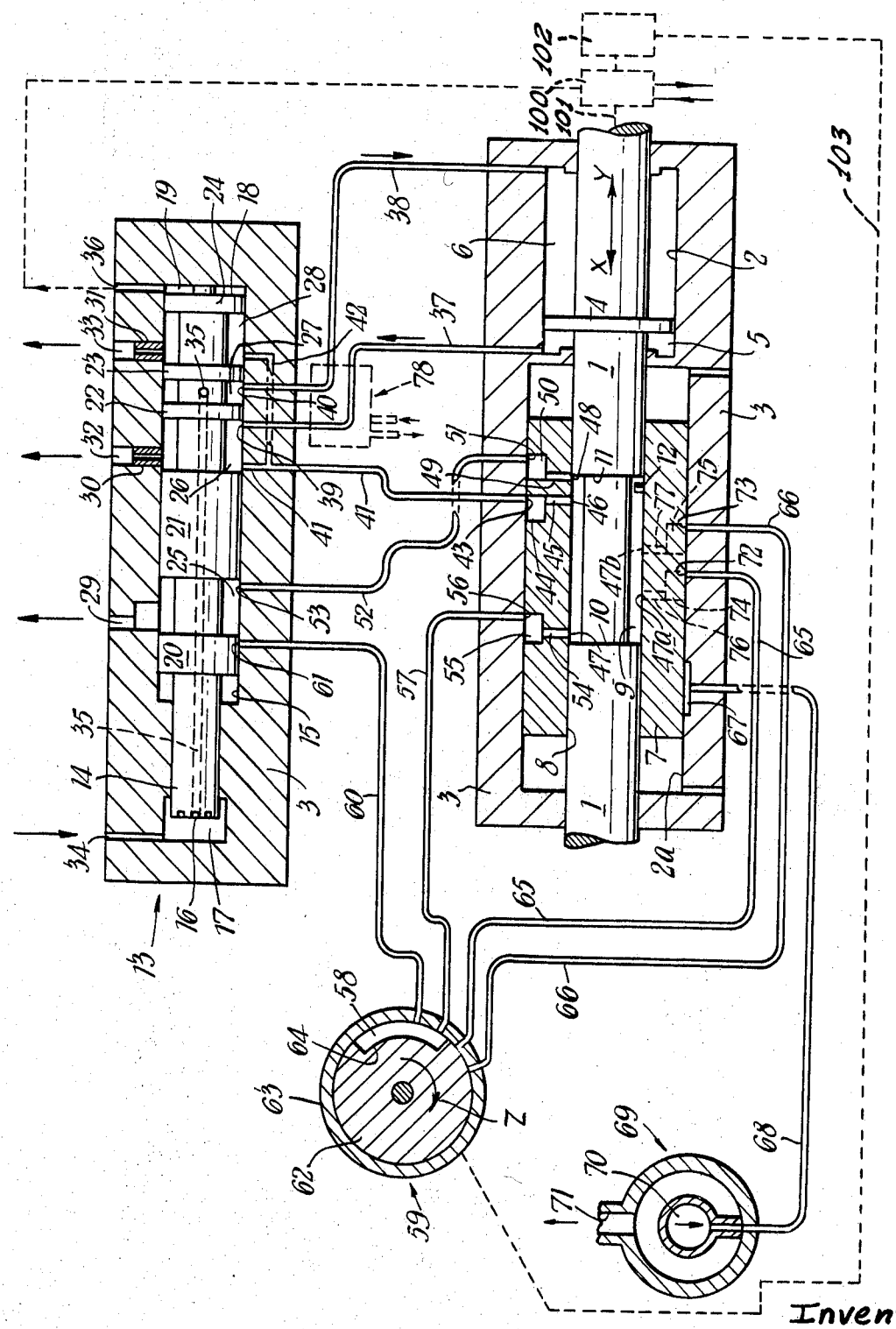
Inventor
Philip Butterworth
By Stevens, Davis, Miller & Mosher
Attorneys

FLUID PRESSURE OPERATED MOTORS

This invention relates to fluid pressure operated motors and in particular to such motors of the type in which a piston is axially reciprocated, either continuously or intermittently, in a housing.

During its reciprocation, the piston can be considered as oscillating in an axial direction about the midpart length (center) of its stroke. Particularly when applied to machine tools, for example with a piston extending from the housing and carrying a tool such as a gear cutter, it is frequently desirable, for a given stroke, to adjust the positions of the end of the stroke relative to the housing so that the length of stroke remains unaltered but the effective center of oscillation is axially adjusted. This permits the distance of axial movement of the tool to remain unaltered whilst the effective bottoming of the tool relative to the housing can be adjusted without repositioning of the housing. It is an object of the present invention to provide a fluid pressure operated motor of the type described in which the center of oscillation of the piston can be axially adjusted and is infinitely variable within predetermined limits relative to the housing.

It is a further object of the present invention to provide a fluid pressure operated motor of the type described which is a modification of the motor described in our copending British Pat. application No. 6797/68 in which axial movement of the piston is permitted by the exhaust of fluid from a pressure chamber and the end of stroke of the piston is determined by the formation of a blockage to such exhaust and in which the axial length of stroke of the piston can be selected from a plurality of available axial length strokes and the center of oscillation of the or the selected stroke of the piston can be adjusted axially within predetermined limits relative to the housing.

According to the present invention there is provided a fluid pressure operated motor which includes a housing; a sleeve cylinder defined by the housing; a cylindrical sleeve located in the sleeve cylinder and capable of axial sliding movement therein; means for axially adjusting the sleeve in its cylinder; locking means for securing the sleeve relative to the housing; a piston cylinder defined by the sleeve; a piston located in the piston cylinder to extend axially therethrough and capable of axial sliding movement therein; and fluid pressure operated means for imparting reciprocal movement to the piston in its axial direction; wherein the piston cylinder is provided with control ports which are adapted to be controlled by lands of the piston during reciprocation of the piston to determine the axial length of stroke of the piston imparted by the fluid pressure operated means and wherein the sleeve can be axially adjusted in its cylinder and secured by the locking means to adjust the center of oscillation of the piston relative to the housing.

Axial adjustment of the sleeve relative to the housing can conveniently be provided by the piston engaging with the sleeve during controlled axial movement of the piston. The piston is preferably arranged to engage with the sleeve to move it axially in one direction when the piston is axially located relative to the sleeve at a position which substantially corresponds to an end of stroke of the piston in said one direction. The ports in the sleeve are preferably arranged so that the closure of a control port by a land of the piston corresponds to the end of stroke of the piston. By arranging for the piston to engage with, and axially move, the sleeve immediately after said control port is closed, the repositioning of the sleeve (and of the piston) always corresponds to an end of stroke of the piston. By this arrangement, assuming a tool is carried on the end of the piston, the piston and sleeve can be moved through the housing until the tool reaches the required bottoming position relative to the housing at which position the sleeve is secured relative to the housing. If the fluid pressure operated means is now operated to impart reciprocal movement to the piston in its axial direction, the piston always returns the tool to the same bottoming position. Conveniently the means of adjusting the sleeve axially within the sleeve cylinder comprises an internal peg in the sleeve which engages with a shoulder on one or other of a pair of shoulders provided on the piston during controlled axial movement of the piston through the housing. Sleeve adjustment means can be provided whereby controlled axial movement of the piston in the housing can be obtained in the case where the piston and sleeve engage to axially adjust the position of the sleeve within the sleeve cylinder. The sleeve adjustment means when in operation to axially adjust the sleeve overrides the fluid flow control means for imparting reciprocation to the piston.

The axial length of stroke of the piston can be controlled by at least two axially spaced ports in the sleeve which cooperate with and are controlled by lands of the piston. Preferably one port is a control port which determines the bottoming position of the piston so that closure of the control port by a piston land corresponds to the end of stroke of the piston in one sense of direction of its axial movement during reciprocation. The end of stroke of the piston in the opposite sense of direction of its axial movement can be determined by the closure of a second control port by the piston land.

In a preferred form of construction of the motor two pressure chambers are provided of which one pressure chamber is adapted to alternately contract and expand and the other pressure chamber is adapted simultaneously to alternately expand and contract respectively during reciprocation of the piston. Piston land means on the piston is adapted to control the opening and closing of two axially spaced control ports in the piston cylinder. A first pressure chamber, during its contraction by movement of the piston in one sense of axial direction, is adapted to exhaust through a first control port controlled by the piston land means and the end of stroke of the piston in the one sense of axial direction is determined by the first control port being closed by the piston land means. The second pressure chamber, during its contraction by movement of the piston in the opposite sense of axial direction is adapted to exhaust through the second control port controlled by the piston land means and the end of stroke of the piston in the opposite sense of axial direction is determined by the second control port being closed by the piston land means. By such a construction the piston is arrested at each end of its stroke as the control port through which the contracting pressure chamber exhausts is closed by the piston land means. Such a motor is the subject of our copending British Pat. application No. 6797/68 and conveniently the piston has two axially spaced lands which, together with the piston cylinder, define an exhaust chamber which is adapted to communicate with the contracting pressure chamber during axial movement of the piston. Preferably the contracting pressure chamber is adapted to communicate with the exhaust chamber by way of an input port in the piston cylinder which is in permanent communication with the exhaust chamber and is located axially between the two control ports. The first of the control ports is controlled by a first piston land so that it alternately opened and closed to communication with the exhaust chamber and the second of the control ports is controlled by the second piston land so that it is alternately opened and closed to communication with the exhaust chamber. The control ports and piston lands are arranged so that at least one or other of the control ports is always open to communication with the exhaust chamber during reciprocation of the piston. The first pressure chamber when contracting is adapted to exhaust by way of the exhaust chamber and the first control port so that the end of stroke of the piston in the first sense of axial direction is determined when the first control port is closed by the first piston land. The second pressure chamber, when contracting is adapted to exhaust by way of the exhaust chamber and the second control port so that the end of stroke of the piston in the opposite sense of axial direction is determined when the second control port is closed by the second piston land. Valve means is provided which, in a first operative condition consistent with the piston moving in the one sense of axial direction closes communication between the second control port and exhaust and opens communication between the first control port and exhaust, and in a second operative condition consistent with the piston moving in the opposite sense of axial direction closes communication between said first control port and exhaust and opens communication between said second control port and exhaust.

The fluid pressure operated motor of the present invention in which the piston is adapted to exhibit reciprocal movement can be of the type which is known in the art as a "double acting device." To provide such a device one pressure chamber can be alternately connected to fluid pressure and exhaust and the other pressure chamber simultaneously and alternately connected to exhaust and fluid pressure respectively. To achieve this end the motor can include further valve means having a first operative condition in which the second pressure chamber is adapted to communicate with fluid pressure and the first pressure chamber is adapted to communicate with exhaust by way of the first control port and a second operative condition in which the first pressure chamber is adapted to communicate with fluid pressure and the second pressure chamber is adapted to communicate with exhaust by way of the second control port. The piston is caused to reciprocate in its cylinder by adjustment of the further valve means from its first operative condition to its second operative condition and vice versa. In the double acting motor as above described the valve means and further valve means are preferably coupled together for simultaneous adjustment from their respective first operative conditions to their respective second operative conditions and vice versa; and conveniently the valve means and further valve means are incorporated in a spool valve in which the spool, at one end of its stroke, adjust the spool valve to provide the above-mentioned first operative conditions and the spool at the other end of its stroke adjusts the spool valve to provide the above-mentioned second operative conditions.

The axial length of stroke of the piston can be varied by providing an axially disposed array of ports from which the second control port can be selected by port selection means. The port selection means is arranged to open and close the array of ports so that the selected port or ports which correspond to the desired length of stroke of the piston in its cylinder can be opened by the port selection means to communicate with exhaust whilst the ports in the array which correspond to a piston stroke of greater length are closed by the port selection means so that when the selected second control port is closed by the control surfaces of the piston, the piston is at the end of its stroke.

The fluid pressure operated means for continuously or intermittently reciprocating the piston can be obtained by using a piston having opposed working faces of different effective areas, the smaller effective area defining with the or a further housing a constant pressure piston chamber and the larger effective area defining with the or a further housing an la alternating pressure piston chamber, fluid under constant pressure is applied to the constant pressure piston chamber and the piston is reciprocated by alternately connecting the alternating pressure piston chamber to a source of fluid under pressure and exhaust. The flow of fluid under pressure to, and exhaust from, the alternating pressure piston chamber can be controlled by valve means which is conveniently in the form of a spool valve the spool of which is adapted to reciprocate in its housing between end positions and in so doing to control whether the alternating pressure piston chamber is open to exhaust or to fluid under pressure. The reciprocation of the spool can be effected by the control of fluid under pressure to the spool housing which fluid flow can be controlled by the opening and closing of auxiliary ports between the sleeve and piston by control surfaces of the piston so that the spool is caused to reverse at the end of each stroke of the piston and in so doing causes the piston to reverse.

Alternatively, when the fluid pressure operated means is in the form of a double acting device in which the spool valve controls the flow of fluid under pressure to, and exhaust from, opposite sides of the piston to move the piston in one sense of axial direction and, at the end of stroke of the piston, the spool valve reverses to move the piston in the opposite sense of axial direction, reversal of the spool valve is adapted to correspond with the end of stroke of the piston so that the reversal of the spool valve remains in phase with reversal of the piston. This can be achieved by changeover valve means which is operatively controlled by movement of the piston from one end of its stroke to the other and vice versa and is adapted to reverse the spool valve at the end of stroke of the piston. Preferably the spool of the spool valve has opposed working faces with different effective areas of which the working face of smaller area defines with one part of the spool cylinder a constant pressure spool chamber which is adapted to be in communication with a source of fluid under constant pressure and the working face of larger effective area defines with another part of the spool cylinder an alternating pressure spool chamber so that when the alternating pressure spool chamber is alternately opened to exhaust and to the source of fluid under pressure the spool reciprocates axially. The supply of fluid under pressure to, and exhaust from, the alternating pressure spool chamber is determined by the changeover valve means at the ends of stroke of the piston so that the spool reverses simultaneously with the piston reaching the end of its stroke to pass fluid under pressure to the piston to cause the latter to reverse and move axially in the correct sense.

The locking means by which the sleeve is secured to the housing can conveniently comprise a fluid pressure pad and recess means is provided between the sleeve and its cylinder in which a pad of fluid under pressure is formed between the sleeve and housing to apply a radial force to the sleeve which tends to radially displace the sleeve in its cylinder to an extent sufficient to lock it in its cylinder whilst permitting axial sliding movement of the piston through the sleeve. The fluid pressure pad can be formed in a part annular recess provided in one side f the sleeve cylinder or in a part annular recess provided in the cylindrical outer surface of the sleeve.

It is to be appreciated that the term "fluid" as used throughout this specification includes both liquids and gases, for example, the invention may apply equally to pneumatic (gas-pressure-operated) motors and to hydraulic (liquid-pressure-operated) motors, the detailed modifications necessary for the particular type of fluid being obvious to a person skilled in the relevant art.

One embodiment of the present invention will now be described, by way of example only, with reference to the accompanying diagrammatic drawing which shows an axial section through a motor constructed in accordance with the present invention and in which the means for imparting reciprocal movement to the piston in its axial direction is provided by a double acting piston and cylinder arrangement, fluid flow to the arrangement being controlled by a pressure biased spool valve.

The motor illustrated includes a piston 1 which is slidably located for movement in an axial direction in a cylinder 2 defined by a housing 3. The piston 1 extends at each end from the housing 3 and the housing 3 further defines a sleeve cylinder 2a through which the piston 1 extends. The cylinder 2a is coaxial with the cylinder 2. Slidably located in the cylinder 2 is a flange 4 formed integrally with the piston 1. One side face of the flange 4 and the adjacent end part of the cylinder 2 define a pressure chamber 5 and the other side face of the flange 4 and the adjacent end part of the cylinder 2 define a further pressure chamber 6. It will be apparent that if the pressure chamber 5 is pressurized whilst the chamber 6 is exhausted the piston 1 will move in an axial direction rightwardly in the drawing and if the chamber 6 is pressurized whilst the chamber 5 is exhausted the piston will move in an axial direction leftwardly in the drawing and the mechanism acts, in effect, as a double acting piston and cylinder device.

Located within the sleeve cylinder 2a for axial sliding movement therein is a sleeve 7 which defines a piston cylinder 8. The piston cylinder 8 is coaxial with the sleeve cylinder 2a and the piston 1 is slidably located within and extends axially through, the cylinder 8. The piston 1 has an annular recess which defines an exhaust chamber 9 with the piston cylinder 8, the axial length of the exhaust chamber 9 being defined by a pair of axially spaced piston lands 10 and 11. The sleeve 7 carries an internal peg 12 which is located to project into the exhaust chamber 9 so that when the piston 1 moves tin in the direction X relative to the sleeve the shoulder of land 11 can abut the peg 12 and move the sleeve 7 axially in the direction X through its cylinder 2a and when the piston is moved axially in the direction Y the shoulder of land 10 can abut the peg 12 and move the sleeve 7 axially within its cylinder 2a in the direction Y.

The motor includes a pressure biased spool valve shown generally at 13 in which a stepped spool 14 is slidably located for movement in an axial direction in a spool cylinder 15 having a stepped bore which is conveniently defined by the housing 3. The spool 14 has its smaller diameter slidable in the smaller bore of the spool cylinder and its larger diameter slidable in the larger bore of the spool cylinder. The smaller end 16 of the spool defines with one end of the spool cylinder a constant pressure spool chamber 17 and the larger end 18 of the spool defines with the other end of the spool cylinder an alternating pressure spool chamber 19. The spool has five lands 20 to 24 which define an array of axially spaced annular recesses which recesses, together with the spool cylinder 15, define four transfer chambers 25 to 28. The transfer chamber 25 is connected through a passage 29 in the housing 3 to be in permanent communication with exhaust and the transfer chambers 26 and 28 are each adapted to be in permanent communication with exhaust by way of hydraulic restrictors 30 and 31 located in passages 32 and 33 in the housing 3. The constant pressure spool chamber 17 is adapted to be connected to a source of hydraulic fluid under constant pressure by way of a passage 34 and the transfer chamber 27 communicates with the constant pressure spool chamber 17 by way of an internal passage 35 provided through the spool so that the transfer chamber 27 is always under pressure with the chamber 17. The alternating pressure spool chamber 19 is adapted to be alternately connected, through passage 36, and changeover valve means shown generally at 100 between the source of hydraulic fluid under pressure and exhaust so that when the chamber 19 is connected to exhaust and chamber 17 to pressure the spool 14 moves axially in the direction of its bias, i.e. rightwardly in the drawing, due to the hydraulic pressure in the chamber 17 and when the alternating pressure chamber 19 is connected to the source of hydraulic fluid under pressure the spool 14 moves axially in the direction against its bias, i.e., leftwardly in the drawing. It will be apparent that by alternating the chamber 19 between fluid under pressure and exhaust the spool 14 can be reciprocated intermittently or continuously.

The pressure chambers 5 and 6 communicate with the spool cylinder 15 through passages 37 and 38 and open into the spool cylinder 15 through axially spaced ports 39 and 40. The ports 39 and 40 are located so that at the end of the stroke of the spool 14 in the direction of its bias, the port 39 communicates with transfer chamber 26 and port 40 communicates with transfer chamber 27. The ports 39 and 40 are controlled by the lands 22 and 27. The ports 39 and 40 are controlled by the lands 22 and 23 respectively of the spool so that when the spool is moved to the end of its stroke in the direction against its bias the land 22 closes port 39 and reopens it to the transfer chamber 27 and the land 23 closes port 40 and reopens it to the transfer chamber 28. The ports 39, 40 and spool lands 22, 23 are so arranged that in no position of the spool do both ports 39, 40 simultaneously communicate with pressure by way of transfer chamber 27 or simultaneously communicate with exhaust by way of either chamber 26 or chamber 28. The transfer chambers 26 and 28 are connected through passages 41 and 42 to communicate with the sleeve cylinder 2a As illustrated, the passage 41 opens into the sleeve cylinder 2a by way of a port 43 which port is located to be in permanent communication with an external port 44 in the sleeve 7. The external port 44 communicates through a passage 45 in the sleeve to an input port 46 in the piston cylinder 8. The input port 46 is located to be in permanent communication with the exhaust chamber 9.

Located in the piston cylinder 8 are two control ports 47 and 48 which are spaced from the input port 46 in the axial direction and are located axially one on each side of the port 46. The control port 48 is controlled by the piston land 11 during reciprocation of the piston so that it is either closed by the land 11 or open into the exhaust chamber 9. Further, the peg 12 is located so that the land 11 shuts off communication between the exhaust chamber 9 and the control port 48 immediately before the shoulder of the land 11 abuts the peg 12. The control port 47 is controlled by the piston land 10 so that during reciprocation of the piston the port 47 is either closed by the land 10 or open into the exhaust chamber 9.

The control port 48 communicates through a passage 49 in the sleeve 7 with an external port 50 in the sleeve. The external port 50 is located to be in permanent communication with a port 51 in the sleeve cylinder 8. The port 51 communicates with the spool cylinder 15 by way of a passage 52 and opens into the spool cylinder through a port 53. The port 53 is located so that with the spool at the end of its stroke in the direction of its bias, the port communicates with the transfer chamber 25 and the port 53 is controlled by the spool land 21 so that with the spool at the end of its stroke in the direction against its bias the port is closed by the land 21. The control port 47 communicates through a passage 54 in the sleeve 7 with an external port 55 in the sleeve. The external port 55 is located to be in permanent communication with a port 56 in the sleeve cylinder 2a. The port 56 communicates through a passage 57 with a chamber 58 in port selection means shown generally at 59. The chamber 58 is adapted to be in permanent communication with a passage 60 which communicates with the spool cylinder 15 and opens into the spool cylinder by way of port 61. The port 61 is located so that with the spool 14 at the end of its stroke in the direction against its bias the port opens into the transfer chamber 25 and the port 61 is controlled by the spool land 20 so that when the spool is moved to the end of its stroke in the direction of its bias the port 61 is closed by the land 20. The ports 53 and 61 are so axially spaced relative to the axial spacing of the lands 20 and 21 that when one port is closed by its associated land the other port communicates with the transfer chamber 25 and both ports 53 and 61 do not simultaneously communicate with the transfer chamber 25.

The port selection means 59 conveniently comprises a cylindrical member 62 which is capable of adjustable axial rotation within a sleeve 63. The cylindrical member 62 is provided in its surface with a part annular recess 64 which recess, together with the inner cylindrical wall of the sleeve 63, defines the chamber 58. A plurality of passages (that is, in this example, four) 57, 60, 65 and 66 pass through the sleeve member to the cylindrical member 62 and communicate therewith in a peripherally spaced array so that by rotation of the cylindrical member 62 the passage 60 can communicate, through the transfer chamber 58, solely with the passage 57, or only with both passages 57 and 65, or with all the passages 57, 65 and 66.

The control ports 47 and 48 are axially spaced relative to the piston lands 10 and 11 so that when one control port is closed by its associated land from communication with the exhaust chamber 9 the other control port is always in communication with the exhaust chamber 9. Further, assuming that only one of the control ports 47, 48 communicates with the exhaust chamber 9, the control port which is open to the chamber 9 is also adapted to communicate with exhaust through the transfer chamber 25 and passage 29 by suitable positioning of spool 14 and the spool valve 13 is adapted to control the flow of fluid under pressure to and exhaust from the pressure chambers 5 and 6 so that the piston moves axially in a direction in which the control port which is open to the exhaust chamber 9 is subsequently closed by its associated piston land whilst that piston land is moving in a direction towards the port 46.

The sleeve cylinder 2a is provided with a part annular recess 67 which is located to be permanently closed by the cylindrical external surface of the sleeve 7. The recess 67 communicates through a passage 68 with a fluid pressure/exhaust valve 69. The valve 69 includes an adjustable member 70 through which fluid under pressure can flow and which can be adjusted (in this example by axial rotation) so that the passage 68 either communicates with fluid pressure in the member 70 (as shown) or communicates with an exhaust passage 71. With the passage 68 under pressure a fluid pad is formed in the recess 67 and the pressure of fluid applies a radially directed force on the sleeve which secures the sleeve 7 in its cylinder.

We will now consider operation of the above described and illustrated motor. With the sleeve 7 secured by hydraulic fluid pressure in the recess 67 a source of hydraulic fluid under pressure is connected to the passage 34 and the passages 29, 32, 33 and 36 are connected to exhaust. The spool 14 moves axially until it abuts (as shown) the housing 3 at the end of its stroke in the direction of its bias. Hydraulic fluid under pressure now passes by way of passage 35 transfer chamber 27 and passage 38 into the pressure chamber 6. The pressure chamber 5 is simultaneously connected to exhaust by way of passage 37, transfer chamber 26, passage 41, input port 46, exhaust chamber 9, control port 48, passages 49 and 52, transfer chamber 25 and exhaust passage 29. Consequently the piston 1 is moved axially in the direction of arrow X. The control port 47 is effectively closed to exhaust since the port 61 in the spool cylinder 15 is closed by the land 20. The piston 1 continues to move in the direction X until the land 11 closes the control port 48 from communication with the exhaust chamber 9 which consequently shuts off communication between the pressure chamber 5 and exhaust. A blockage is thereby formed to the exhaust of fluid from the pressure chamber 5 to arrest movement of the piston 1 in the direction X irrespective of hydraulic fluid pressure in the pressure chamber 6. It will be apparent that the arresting of the piston can be severe and the arresting is conveniently cushioned by the hydraulic restrictor 30 which communicates with the transfer chamber 26. Hydraulic pressure builds up in the pressure chamber 5 when the control port 48 closes and such pressure is fractionally relieved through the restrictor 30 to cushion the arrest of the piston.

For practical purposes, neglecting loss of fluid through the restrictor 30, the end of stroke of the piston 1 subsequent to movement of the piston in the direction X is the position at which the land 11 closes the control port 48; the piston therefore remains at the end of its stroke until the pressure chambers 5 and 6 are respectively connected to fluid under pressure and exhaust to move the piston axially in the direction Y. This is achieved by axial movement of the spool 14 to the end of its stroke in the direction against its bias.

The passage 36 is connected to the source of hydraulic fluid under pressure and hydraulic pressure in the alternating pressure spool chamber 19 causes the piston to move axially against its bias and in so doing causes the spool land 20 to open the port 61 to the transfer chamber 25, the spool land 21 to close the port 53, the spool land 22 to close the port 39 and reopen it to communication with the transfer chamber 27 and the spool land 23 to close the port 40 and reopen it to communication with the transfer chamber 28. Hydraulic fluid under pressure can now pass from the transfer chamber 27 by way of port 39 and passage 37 into the pressure chamber 5 whilst the pressure chamber 6 simultaneously communicates by way of passage 38, port 40, transfer chamber 28, passages 42, 41 and 45, input port 46, exhaust chamber 9, control port 47, passages 54 and 57, chamber 58, passage 60, port 61, transfer chamber 25 and passage 29 to exhaust. Consequently the piston 1 is caused to move axially in the direction of arrow Y. The control port 48 is effectively closed to exhaust since the port 53 is closed by the spool land 21.

The piston 1 continues to move axially in the direction of arrow Y until the piston land 10 eventually shuts off communication between the control port 47 and the exhaust chamber 9 which consequently shuts off communication between the control port 47 and the exhaust chamber 9 which consequently shuts off communication between the pressure chamber 6 and exhaust and forms a blockage to the exhaust of fluid from the pressure chamber 6 to arrest the piston irrespective of hydraulic fluid pressure in the pressure chamber 5. In a similar manner to the arresting of movement of the piston 1 in the direction X the arresting of movement of the piston in the direction Y is conveniently cushioned by the pressure chamber 6 communicating with exhaust through the hydraulic restrictor 31 and passage 33. For practical purposes, assuming negligible fluid loss through the restrictor 31, it will be apparent that the end of stroke of the piston 1 subsequent to its movement in the direction Y, corresponds to the position when the control port 47 is shut off from communication to exhaust chamber 9 by the piston land 10.

It is frequently desirable to adjust the axial length of stroke of the piston 1 and this is conveniently achieved by providing means whereby the axial position of the control port 47 in the piston cylinder can be selected from an axially disposed array of ports. In the present example, the passages 65 and 66 from the port selection means 59 communicate with ports 72 and 73 respectively in the sleeve cylinder 2a. The ports 72 and 73 are located to be in permanent communication respectively with external ports 74 and 75 in the sleeve. The port 74 communicates through a passage 76 in the sleeve with a port 47a in the piston cylinder and the port 75 communicates through a passage 77 in the sleeve with a port 47b in the piston cylinder. The array of ports 47, 47a and 47b are located on the side of the port 46 axially remote from the control port 48. As aforementioned the end of stroke of the piston 1 subsequent to movement in the direction occurs when the control port through which the exhaust chamber 9 communicates with exhaust is subsequently closed to exhaust by the piston land 10. By rotating the cylinder member 62 in the direction of arrow Z the exhaust chamber 9 can further be connected to exhaust either by way of the passages 57 and 65, or by way of the passages 57, 65 and 66 as required. It will be apparent that the shortest length of stroke of the piston 1 is obtained when the passages 65 and 66 are closed by the cylindrical member 62 and the longest stroke is obtained when the passages 60 and 66 are in communication.

When the piston 1 reciprocates in the piston cylinder 8 it can be considered as oscillating in an axial direction about the mid axial length position between the ends of the piston stroke, i.e., the center of oscillation. For the (or any given pair of) control ports such as 48 and 47, the center of oscillation of the piston is fixed relative to the sleeve 7. It may be desirable to vary the position of the center of oscillation of the piston axially relative to the housing 3 without altering the length of stroke of the piston. To provide such variation the sleeve 7 is axially adjustable within the sleeve cylinder 2a.

In the above described and illustrated embodiment, assuming that an end of the position 1 carries a tool which is to be reciprocated, may be required that the tool at one end of stroke of the piston is, for a particular application, located at a set (but adjustable) distance from the housing 3. In this case the passages 37 and 38 are effectively disconnected from the spool valve 13 (conveniently by selector valve means shown generally at 78) and the passage 37 is connected (through the selector valve means) to fluid under pressure and the passage 38 is connected to exhaust. Consequently, the pressure chambers 5 and 6 are pressurized and exhausted respectively and the piston moves in the direction Y irrespective of the spool valve 13. The member 70 is rotated to open the passage 68 to exhaust and thereby release the locking effected by the hydraulic pad in recess 67 on the sleeve 7.

The piston 1 moves in the direction Y and eventually the annular shoulder of piston land 10 abuts the peg 12 and causes the sleeve 7 to move axially in the direction Y to an end position which corresponds to the piston flange 4 reaching the end of cylinder 2. If the pressure chamber 6 is now connected to fluid under pressure (by the selector valve means 78) and the pressure chamber 5 connected to exhaust, controlled movement of the piston can be obtained in the direction X. The piston 1 moves in the direction X and eventually the annular shoulder of the land 11 abuts the peg 12 and causes the sleeve to move axially in direction X.

As has been previously described the shoulder of land 11 abuts the peg 12 immediately after the position at which the land 11 has closed the control port 48 and consequently if the axial movement of the piston is stopped, the position of the piston (and of the tool) is that which corresponds to the end of stroke of the piston in the direction X relative to the housing 3 plus the axial length of overlap between the adjacent edges (or faces) of peg 12 and control port 48. The piston 1 and sleeve 7 are moved axially in the direction X until the tool is located at the required position and the pressure chamber 6 is opened to exhaust. The member 70 is rotated to pressurize the fluid pad in recess 67 and the sleeve is secured in position in its cylinder. The passages 37 and 38 are reconnected to the spool valve 13 as shown (through the selector valve means 78) and the motor operated as above described. The piston 1 now oscillates with a given stroke, about a new center of oscillation relative to the housing 3.

Conveniently, the spool valve 13 is arranged so that it is caused to reverse from one end of its stroke to the other automatically at the end of each stroke of the piston to reverse the piston. This can be achieved by the alternating pressure spool chamber 19 being connected alternately to exhaust and with the source of fluid under pressure by way of the changeover valve means 100 which is operatively controlled through line 101 by movement of the piston from one end of its stroke to the other and vice versa, so that at one end of the stroke of the piston the changeover valve means 100 causes the chamber 19 to communicate with hydraulic fluid under pressure and at the other end of the piston stroke the changeover valve means 100 causes the chamber 19 to communicate with exhaust. It will be realized that, in the above described example in which the control port 47 can effectively be varied axially (i.e., through the port selection means 59 and ports 47, 47a and 47b), reversal timing adjustment means shown generally at 102 can be provided which ensures that the spool valve is caused to reverse at each end of the piston stroke irrespective of the relative position in the piston cylinder at which the piston stroke ends thereby ensuring that the spool and piston remain in phase. In this case the port selection means for the control port and reversal timing adjustment means for ensuring that the reversal of the spool valve and reversal of the piston remain in phase can be ganged together as indicated at 103 so that when the length of stroke of the piston is adjusted the timing at which the spool valve is reversed is simultaneously adjusted to maintain the reversal of the spool valve in phase with the end of stroke of the piston. The changeover valve means, the reversal timing adjustment means, and the connection between said changeover valve means, reversal timing adjustment means and the alternating pressure spool chamber are preferably arranged in accordance with the disclosure in our copending British Pat. application No. 6797/68 and the necessary minor modifications to such arrangement will be apparent to persons skilled in the art and having an understanding both of the invention disclosed in the present specification and that disclosed in our application No. 6797/68.

I claim:

1. A fluid pressure operated motor which includes a housing; a sleeve cylinder defined by the housing; a cylindrical sleeve located in the sleeve cylinder and capable of axial sliding movement therein; means for axially adjusting the sleeve in its cylinder; locking means for securing the sleeve relative to the housing; a piston cylinder defined by the sleeve; a piston located in the piston cylinder to extend axially therethrough and capable of axial sliding movement therein; and fluid pressure operated means for imparting reciprocal movement to the piston in its axial direction; wherein the piston cylinder is provided with control ports which are adapted to be controlled by lands of the piston during reciprocation of the piston to determine the axial length of stroke of the piston imparted by the fluid pressure operated means and wherein the sleeve can be axially adjusted in its cylinder and secured by the locking means to adjust the center of oscillation of the piston relative to the housing.

2. A fluid pressure operated motor as claimed in claim 1 wherein said locking means is adapted to comprise a fluid pressure pad and recess means is provided between the sleeve cylinder and sleeve, which recess means is adapted to communicate alternatively with fluid pressure or exhaust whereby, with fluid pressure in said recess means, a radially directed force is imparted between the sleeve and its cylinder to secure the sleeve relative to the housing.

3. A fluid pressure operated motor as claimed in claim 1 wherein the piston is capable of engagement with the sleeve during axial movement of the piston in its cylinder in one sense of axial direction at a position which substantially corresponds to the end of stroke of the piston in said one sense of axial direction and sleeve adjustment means is provided which overrides said means for imparting reciprocal movement to the piston and is adapted to impart controlled axial movement to the piston in said one sense of axial direction whilst the piston and sleeve are in engagement to adjust the axial position of the sleeve in its cylinder and thereby adjust the end of stroke of the piston axially relative to the housing.

4. A fluid pressure operated motor as claimed in claim 3 wherein the piston is capable of engagement with the sleeve during axial movement of the piston in its cylinder in the opposite sense of axial direction at a position subsequent to and axially remote from the end of stroke of the piston in said opposite sense of axial direction and the sleeve adjustment means is adapted to impart controlled axial movement to the piston in said opposite sense of axial direction to adjust the axial position of the sleeve in its cylinder from which position the sleeve can be axially reset by controlled movement of the piston in said one sense of axial direction.

5. A fluid pressure operated motor as claimed in claim 1 wherein two pressure chambers are provided, one pressure chamber being adapted to alternately contract and expand and the other pressure chamber being adapted simultaneously to alternately expand and contract respectively during reciprocation of the piston; the piston having piston land means which controls the opening and closing of two axially spaced control ports in the piston cylinder and in which a first pressure chamber, during its contraction by movement of the piston in one sense of axial direction, is adapted to exhaust through a first control port controlled by the piston land means and the end of stroke of the piston in said one sense of axial direction is determined by the first control port being closed by the piston land means; and the second pressure chamber, having its contraction by movement of the piston in the opposite sense of axial direction is adapted to exhaust through the second control port controlled by the piston land means, the end of stroke of the piston in the opposite sense of axial direction being determined by said second control port being closed by the piston land means.

6. A fluid pressure operated motor as claimed in claim 5 wherein the piston has two axially spaced lands which, together with the piston cylinder, define an exhaust chamber which is adapted to communicate with the contracting pressure chamber during axial movement of the piston; the first of said control ports being controlled by a first piston land so that it is alternately opened and closed to communication with the exhaust chamber and the second of said control ports being controlled by the second piston land so that it is alternately opened and closed to communication with the exhaust chamber, said control ports and piston lands being arranged so that at least one or other of said control ports is always open to communication with the exhaust chamber during reciprocation of the piston, the first pressure chamber, when contracting, being adapted to exhaust by way of said exhaust chamber and the first control port, the end of stroke of the piston in the one sense of axial direction being determined when the first control port is closed by the first piston land, and the second pressure chamber, when contracting, being adapted to exhaust by way of said exhaust chamber and the second control port, the end of stroke of the piston in the opposite sense of axial direction being determined when the second control port is closed by the second piston land; and wherein valve means is provided which, in a first operative condition is adapted to close communication between the second control port and exhaust and to open communication between the first control port and exhaust when the piston is moving in said one sense of axial direction, and in a second operative condition, is adapted to close communication between said first control port and exhaust and to open communication between said second control port and exhaust when the piston is moving in the opposite sense of axial direction.

7. A fluid pressure operated motor as claimed in claim 6 in which the piston is capable of engagement with the sleeve during axial movement of the position in its cylinder in one sense of axial direction at a position which substantially corresponds to the end of stroke of the piston in one sense of axial direction and sleeve adjustment means is provided which overrides said means for imparting reciprocal movement to the piston and is adapted to impart controlled axial movement to the piston in said one sense of axial direction while the piston and sleeve are in engagement to adjust the axial position of the sleeve in its cylinder and thereby adjust the end of stroke of the piston axially relative to the housing and, wherein the piston is adapted to engage with the sleeve during controlled axial movement of the piston in one sense of axial direction at a position which substantially corresponds to the first control port being closed by the first piston land.

8. A fluid pressure operated motor as claimed in claim 7 wherein the sleeve carries a peg which projects into the exhaust chamber and during controlled axial movement of the sleeve in said one sense of axial direction the first piston land is adapted to engage with the peg to move the sleeve axially within its cylinder in said one sense of axial direction.

9. A fluid pressure operated motor as claimed in claim 5 wherein the piston and said pressure chambers constitute a double acting device and further valve means is provided having a first operative condition in which the second pressure chamber is adapted to communicate with fluid pressure and the first pressure chamber is adapted to communicate with exhaust by way of the first control port and a second operative condition in which the first pressure chamber is adapted to communicate with fluid pressure and the second pressure chamber is adapted to communicate with exhaust by way of the second control port and the piston is caused to reciprocate in its cylinder by adjustment of said further valve means from its first operative condition to its second operative condition and vice versa.

10. A fluid pressure operated motor as claimed in claim 5 wherein an axially disposed array of ports are provided in the piston cylinder and port selection means is provided by which at least one port in said array can be selected as the second control port for communication with exhaust and the end of stroke of the piston in said opposite sense of axial direction is determined when the selected port or ports of said array is closed by said piston land means.

11. A fluid pressure operated motor as claimed in claim 5 in which the piston is capable of engagement with the sleeve during axial movement of the piston in its cylinder in one sense of axial direction at a position which substantially corresponds to the end of stroke of the piston in one sense of axial direction and sleeve adjustment means is provided which overrides said means for imparting reciprocal movement to the piston and is adapted to impart controlled axial movement to the piston in said one sense of axial direction while the piston and sleeve are in engagement to adjust the axial position of the sleeve in its cylinder and thereby adjust the end of stroke of the piston axially relative to the housing, and wherein said sleeve adjustment means comprises a selector valve operatively associated with the two pressure chambers and having a first condition in which the first pressure chamber can be connected to fluid pressure and the second pressure chamber can be simultaneously opened to exhaust to impart controlled movement to the piston in said opposite sense of axial direction and a second condition in which the second pressure chamber can be connected to fluid pressure and the first pressure chamber can simultaneously be opened to exhaust to impart controlled movement to the piston in said one sense of axial direction.